(12) United States Patent
Damodaran (10) Patent No.: US 10,154,439 B2
(45) Date of Patent: Dec. 11, 2018

(54) DYNAMIC CHANNEL BANDWIDTH SELECTION BASED ON INFORMATION FOR PACKETS TRANSMITTED AT DIFFERENT CHANNEL BANDWIDTHS

(71) Applicant: Aruba Networks, Inc., Sunnyvale, CA (US)

(72) Inventor: Sathish Damodaran, San Jose, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 241 days.

(21) Appl. No.: 14/264,707

(22) Filed: Apr. 29, 2014

(65) Prior Publication Data

US 2015/0312910 A1    Oct. 29, 2015

(51) Int. Cl.
*H04W 28/20* (2009.01)
(52) U.S. Cl.
CPC .................... *H04W 28/20* (2013.01)
(58) Field of Classification Search
CPC .................................................... H04L 43/0894
See application file for complete search history.

(56) References Cited

U.S. PATENT DOCUMENTS

| | | | | |
|---|---|---|---|---|
| 6,393,023 B1 * | 5/2002 | Shimizu | ............... | H04L 1/1867 370/389 |
| 2004/0037257 A1 * | 2/2004 | Ngo | .................... | H04L 1/0003 370/338 |
| 2006/0172711 A1 * | 8/2006 | King | ...................... | H04B 7/061 455/101 |
| 2009/0109913 A1 * | 4/2009 | Won | ..................... | H04W 72/087 370/329 |
| 2010/0330899 A1 * | 12/2010 | Hong | ..................... | H04H 20/63 455/3.01 |
| 2012/0224612 A1 * | 9/2012 | Kim | ........................ | H04L 1/0003 375/219 |
| 2012/0294168 A1 * | 11/2012 | Freda | ................... | H04B 1/0067 370/252 |
| 2012/0324259 A1 * | 12/2012 | Aasheim | ............... | G06F 1/3206 713/320 |
| 2013/0286998 A1 * | 10/2013 | Tamai | ................. | H04W 76/048 370/329 |

(Continued)

*Primary Examiner* — Huy D Vu
*Assistant Examiner* — Kevin M Cunningham
(74) *Attorney, Agent, or Firm* — Hewlett Packard Enterprise Patent Department (57) ABSTRACT

The present disclosure discloses a method and network device for dynamic channel bandwidth selection in a wireless local area network. Specifically, a network device obtains information corresponding to a first set of packets transmitted on one or more of a plurality of channel bandwidths over a first period of time. Based on the information, the network device selects a particular channel bandwidth, of the plurality of channel bandwidths, for transmitting a second set of packets; and transmits the second set of packets at the particular channel bandwidth. Additionally, based on the information, the network device can dynamically select a number of packets, from a second set of packets, to queue at hardware components with channel bandwidth selection for transmission by the hardware components; and can queue the selected number of packets at the hardware components with channel bandwidth selection.

19 Claims, 7 Drawing Sheets

(56) References Cited

U.S. PATENT DOCUMENTS

| | | | | |
|---|---|---|---|---|
| 2014/0098724 A1* | 4/2014 | Park | ................... | H04W 72/042 |
| | | | | 370/311 |
| 2014/0226477 A1* | 8/2014 | Xie | ...................... | H04L 47/824 |
| | | | | 370/234 |
| 2014/0269270 A1* | 9/2014 | Wolcott | ................ | H04L 47/266 |
| | | | | 370/230 |
| 2014/0286226 A1* | 9/2014 | Seok | ................... | H04W 56/00 |
| | | | | 370/312 |
| 2015/0282176 A1* | 10/2015 | MacLeod | ............. | H04L 1/0003 |
| | | | | 370/329 |

* cited by examiner

DYNAMIC CHANNEL BANDWIDTH SELECTION BASED ON INFORMATION FOR PACKETS TRANSMITTED AT DIFFERENT CHANNEL BANDWIDTHS

FIELD

The present disclosure relates to channel bandwidth selection in a wireless local area network. In particular, the present disclosure relates to dynamic channel bandwidth selection based on information for packets transmitted at different channel bandwidths.

BACKGROUND

Wireless digital networks, such as networks operating under the current Electrical and Electronics Engineers (IEEE) 802.11 standards, are spreading in their popularity and availability. In a wireless local area network (WLAN) deployment, a number of clients can be connected to the same wireless network via one or more access points.

The IEEE 11ac standard introduces 80 MHz and 160 MHz wireless communication channels that overlaps with channels (e.g., 40 Mhz and/or 20 Mhz) as specified in IEEE 802.11n standard. Accordingly, sending packets in an 80 Mhz wireless communication channel may be infeasible if the entire bandwidth is not available, for example, because of the overlapping 40 Mhz may be occupied and thus causing the 40 MHz part of the 80 MHz channel busy. Hence, it is important to select an optimal channel bandwidth through which a packet will be transmitted from a network device.

Conventionally, a network device maintains at least two queues that facilitate network packet transmissions. The first queue is maintained by a software module, and the second queue is maintained by a hardware module. During operations, the first queue feeds a number of packets to the second queue periodically. The hardware module selects a channel bandwidth at the time when each packet is transmitted from the second queue. The selection of channel bandwidth typically involves determining which channel has the best quality at the time of transmission, for example, by performing clear channel assessment.

However, in many use case scenarios, the channel having the best quality at the time of transmission may not be the best channel for transmitting a particular packet. This can happen, for example, when the channel with better quality will be occupied by a scheduled activity in the near future. Therefore, it is important to consider a variety of parameters in dynamically and intelligently selecting wireless channel bandwidth for transmitting network packets on wireless networks.

BRIEF DESCRIPTION OF THE DRAWINGS

The present disclosure may be best understood by referring to the following description and accompanying drawings that are used to illustrate embodiments of the present disclosure.

DETAILED DESCRIPTION

In the following description, several specific details are presented to provide a thorough understanding. While the context of the disclosure is directed to channel bandwidth selection in wireless network, one skilled in the relevant art will recognize, however, that the concepts and techniques disclosed herein can be practiced without one or more of the specific details, or in combination with other components, etc. In other instances, well-known implementations or operations are not shown or described in details to avoid obscuring aspects of various examples disclosed herein. It should be understood that this disclosure covers all modifications, equivalents, and alternatives falling within the spirit and scope of the present disclosure.

Overview

Embodiments of the present disclosure relate to channel bandwidth selection in a wireless local area network. In particular, the present disclosure relates to dynamic channel bandwidth selection based on information for packets transmitted at different channel bandwidths.

With the solution provided herein, the disclosed network device obtains information corresponding to a first set of packets transmitted on one or more of a plurality of channel bandwidths over a first period of time. Based on the information, the disclosed network device selects a particular channel bandwidth, of the plurality of channel bandwidths, for transmitting a second set of packets. Then, the disclosed network device transmits the second set of packets at the particular channel bandwidth.

Moreover, according to the solution herein, the disclosed network device obtains information corresponding to a first set of packets transmitted on one or more of a plurality of channel bandwidths over a first period of time. Based on the information, the disclosed network device dynamically selects a number of packets, from a second set of packets, to queue at hardware components with channel bandwidth selection for transmission by the hardware components. Next, the disclosed network device queues the selected number of packets, from the second set of packets, at the hardware components with channel bandwidth selection.

Channel Usage with Different Bandwidths

Figure 1:
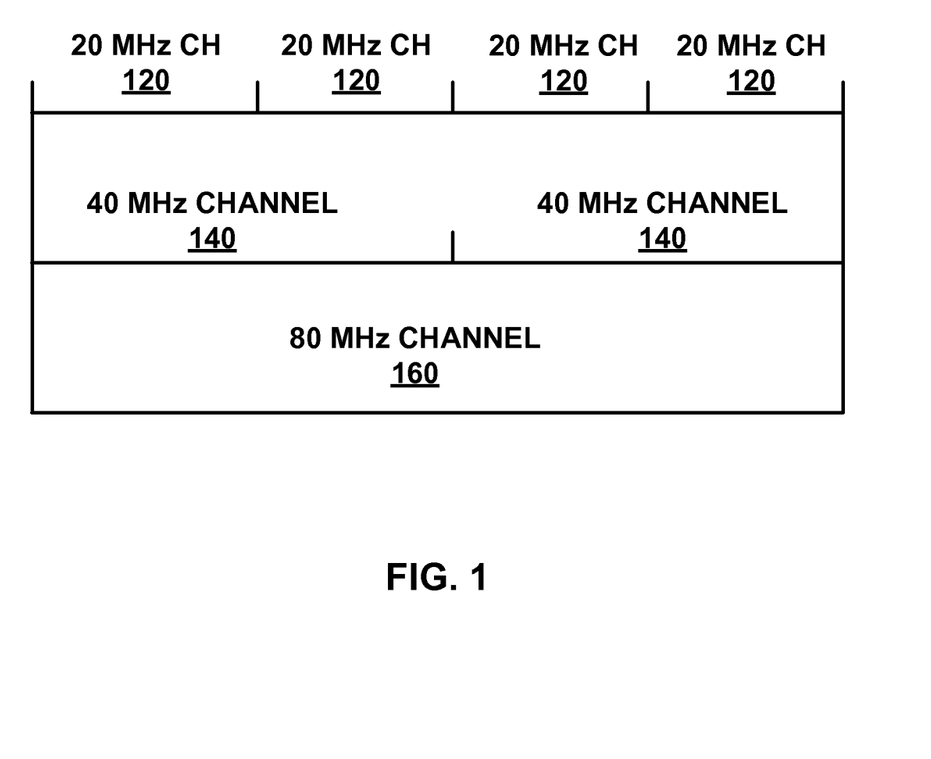
FIG. 1 shows exemplary wireless channel usage with different bandwidths according to embodiments of the present disclosure.

FIG. 1 shows an exemplary channel usage with different bandwidths according to embodiments of the present disclosure. IEEE 802.11n standard allows the use of a 40 MHz wide wireless channel. This enables higher data rates to be achieved versus rates obtainable using the legacy channel bandwidth of 20 MHz. Also, IEEE 802.11ac standard mandates the support for 80 MHz wide channels with options to bond eight 20 MHz channels for a total channel bandwidth of 160 MHz.

Thus, as illustrated in FIG. 1, a wireless signal frequency domain can be divided into different channel bandwidths.

First, the wireless signal frequency domain can be used as four 20 MHz channels 120. Alternatively, the wireless signal frequency domain can be used as two 40 MHz wide channels 140. Each 40 MHz wide channel can be considered to consist of two 20 MHz wide channels that are contiguous in the frequency domain. These two 20 MHz channels are often referred to as the primary channel and the secondary channel. When an access point is configured to use the 40 MHz channel bandwidth, the location of the primary channel can be specified as either the upper half or the lower half of the 40 MHz channel.

Likewise, the wireless signal frequency domain also can be used as a single 80 MHz channel 160. Each 80 MHz wide channel can be considered to consist of two 40 MHz wide channels that are contiguous in the frequency domain. These two 40 MHz channels can also be referred to as the primary channel and the secondary channel. When an access point is configured to use the 80 MHz channel bandwidth, the location of the primary channel can be specified as either the upper half or the lower half of the 80 MHz channel.

It is important to note that channel bandwidth with higher frequency has higher transmission throughput and thus is more efficient at transmitting network packets. However, the channel bandwidth with higher frequency is also less likely to be available. For example, 80 MHz channel 160 is not available for packet transmission if any of the 20 MHz segments or any of the 40 MHz segments is unavailable.

When the disclosed network device transmits a packet queued in its hardware module, the disclosed network device will need to determine at which channel bandwidth the packet will be transmitted.

System Architecture

Figure 2:
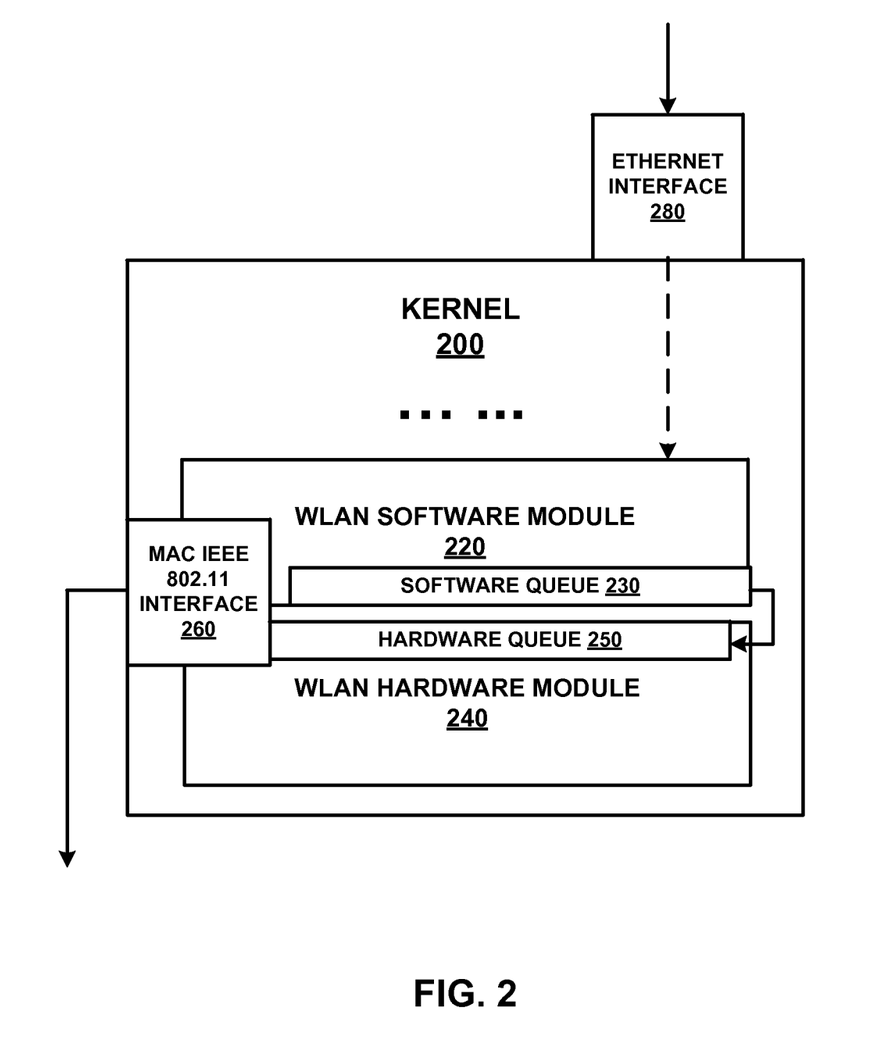
FIG. 2 illustrates exemplary system architecture for dynamic channel bandwidth selections according to embodiments of the present disclosure.

FIG. 2 illustrates exemplary system architecture for dynamic channel bandwidth selections according to embodiments of the present disclosure. FIG. 2 includes at least a kernel 200 from the core system architecture. In addition, the system architecture also includes at least an Ethernet interface 280, and a wireless interface, such as the Media Access Control (MAC) interface in compliance with IEEE 802.11 standards 250. Kernel 200 can be implemented, for example, on Linux platform to support various fundamental networking functionalities. It may further include a wireless local area network (WLAN) software module 220 and a WLAN hardware module 240. Each of the WLAN modules maintains its own queue for network packet transmissions. Specifically, WLAN software module 220 maintains a software queue 230; and, WLAN hardware module 240 maintains a hardware queue 250. Typically, WLAN software module 220 receives a packet, adds the packet to its software queue 230, determines a set of packets in the software queue 230 to be transmitted together, selects a channel bandwidth for transmitting the set of packets, and feeds the set of packets to hardware queue 250 maintained at WLAN hardware module 250. WLAN hardware module 250 receives a set of packets, selects a particular channel with the channel bandwidth determined by WLAN software module 220, and transmits the set of packets on the selected channel. Specifically, WLAN hardware module 250 may select a channel by performing a clear channel assessment (CCA).

Figure 3:
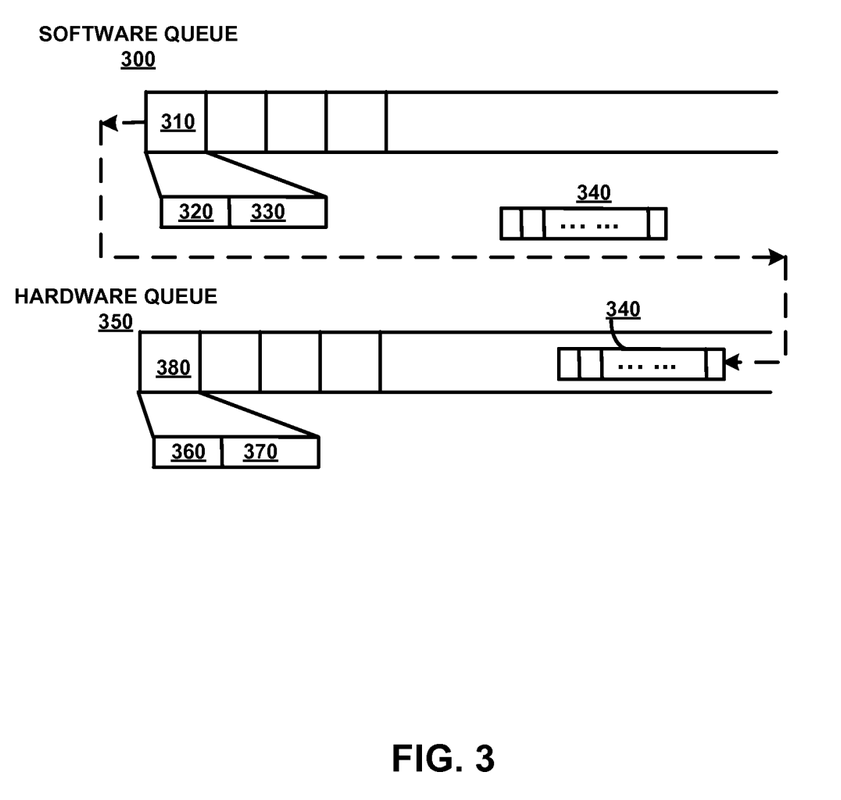
FIG. 3 illustrates exemplary packet queues according to embodiments of the present disclosure.

More specifically, FIG. 3 illustrates exemplary packet queues maintained by WLAN software module and hardware module respectively. FIG. 3 includes at least a software queue 300 and a hardware queue 350. Each of software queue 300 and hardware queue 350 stores a number of packets 310. Periodically, a set of packets 340 is removed from the head of software queue 300 and added to the tail of hardware queue 350. The set of packets 340 will be transmitted to WLAN by hardware module when it moves to the head of hardware queue 350. Each queued element is further associated with at least a selected channel bandwidth and a network data packet. For example, software queue element 310 includes channel bandwidth 320 selected by the software module for network packet 330. Likewise, hardware queue element 380 includes channel bandwidth 360 for network packet 370. While element 310 moves from the tail to the head in software queue 300, channel bandwidth 320 can be adjusted for network packet 330 if the channel condition changes. However, once the packets are added to the hardware queue, selected channel bandwidth 360 will not change for network packet 370.

In some use case scenarios, a set of packets 340 may be determined to be transmitted on a first channel with a first channel bandwidth (e.g., 80 MHz). However, due to the network condition changes, the first channel (e.g., the 80 HMz channel) may not be available anymore after the set of packets 340 is added to hardware queue 350, and thus the set of packets 340 has to be waiting in hardware queue 350 for the first channel (e.g., the 80 MHz channel) to become available before its transmission can be completed.

As the set of packets 340 waits in hardware queue 350, a second set of packets (not shown) may be added to hardware queue 350 waiting to be transmitted on a second channel with a second channel bandwidth (e.g., 40 MHz). The second channel is determined by the software module as the channel with the best quality. Nevertheless, the selection of the second channel is made at the time the second set of packets is added to hardware queue 350. Thus, during the period when the second set of packets has to wait in hardware queue 350 due to the delay of transmission of the first set of packets 340, the network condition may be further changed causing the second channel to be associated with lower channel qualities. By the time the second set of packets (not shown) is to be transmitted, the second channel (e.g., the 40 MHz channel) may not be the channel with the best quality for transmission of the second sets of packets.

As mentioned above, unlike the software queue, once packets are queued in the hardware module, the selected channel bandwidth for transmitting such packets can no longer be changed due to hardware limitations. Conventionally, the hardware module relies on the software module to select the channel bandwidth for transmitting the packets. This is sometimes unreliable as the software may or may not select the best channel bandwidth. Thus, it may be possible that a set of packets can wait in the queue for a long time for its assigned wireless channel (e.g., 80 MHz) to become available. In the worst case scenario, assuming that a continuous interference signal is detected at a lowest 20 MHz segment after a set of packets was added to the hardware queue. If the software module selects 80 MHz channel for transmission of the set of the packets, the packets will be unable to transmit because the 80 HMz channel will not become available with the continuous interference occupying its lowest 20 MHz segment. However, instead of waiting for the 80 MHz channel to become available in this case, the packets could be transmitted on the 40 MHz channel in the higher 40 MHz segment of the 80 MHz channel.

In some embodiments, instead of assigning a particular channel bandwidth to a packet, the WLAN software module selects a set of transmission rates for the packet. When the WLAN hardware module receives the set of selected transmission rates, the WLAN hardware module determines which channel bandwidth to use for the transmission of the packet. Once the channel bandwidth is selected, the WLAN hardware module cannot modify or change it while the packet is in the hardware queue.

Accordingly, embodiments of the present disclosure aim to keep hardware queue 350 at a relatively small size, such that hardware queue 350 does not accumulate for additional packets and allows for accurate selection of the channel bandwidth for transmission of queued packets. Keeping hardware queue 350 also allows the system to react to channel condition changes quickly.

Network according to embodiments of the present disclosure may operate on a private network including one or more local area networks. The local area networks may be adapted to allow wireless access, thereby operating as a wireless local area network (WLAN). In addition, the WLAN may include multiple network control plane devices, such as network controllers, access points or routers capable of controlling functions, etc. Each network control plane device may be located in a separate sub-network. The network control plane device may manage one or more network management devices, such as access points or network servers, within the sub-network. Moreover, a number of client devices can be connected to the access points in the WLAN via wired or wireless connections.

Dynamic Channel Bandwidth Selection Based on Historical Data

Due to limitations imposed by WLAN hardware modules (e.g., lack of packet transmission historical information), the WLAN hardware module not equipped to select the best channel bandwidth for queued packets. At best, the WLAN hardware module can determine a channel bandwidth for a packet based on the current channel condition and the current packet information. Note that, a channel can be occupied during a particular period of time. However, the fact that the channel is currently occupied does not necessarily indicate that switching channel for transmission shall be initiated. In fact, if there is a historical pattern indicating that the channel will be available shortly, it may be desirable to wait for a high bandwidth channel to become available than switching to a low bandwidth channel with a low transmission rate. Alternatively, instead of switching to a new channel, it may be advantageous to continue using the same channel but only use a higher segment of the same channel that is free from any interference signals.

According to embodiments of the present disclosure, the WLAN software module can select the channel bandwidth for queued packets dynamically based on historical information or data known to or acquired by the WLAN software module. In some embodiments, the software module evaluates a set of parameters in dynamic channel bandwidth selection for a particular set of packets. The set of parameters includes, but is not limited to, an amount of time spent on transmitting packets on a particular channel corresponding to a selected channel bandwidth, CCA assessment on the channel, the history of packets transmission (e.g., the average time it takes to transmit the packets at 20 MHz, 40 MHz, and/or 80 MHz during a recent period of time), channel probing data, etc. Based on the evaluation of the set of parameters, the software module dynamically selects a channel bandwidth for a set of packets.

In some embodiments, while transmitting queued packets using a particular channel bandwidth (e.g., 80 MHz), the software module may periodically send probing packets on other channels with different channel bandwidth (e.g., 20 MHz, 40 MHz, etc.) and estimates the packet transmission rate on other channels based on the transmission outcome of the probing packets. Even though the transmission rate at the current channel (e.g., the 80 MHz channel) may be low, the probing data may show that other channels with different channel bandwidth are also low. In such scenarios, it is better to remain on the current channel (e.g., the 80 MHz channel) because the low transmission rate is likely temporary and may increase in the future. By contrast, other available channels may be associated with the low transmission rate as limited by the channel bandwidth itself and may not have the potential to improve packet transmission rates in the future.

In some embodiments, the software module keeps the history of packet transmission. In particular, the software module determines on which channel frequency each set of packets has been transmitted in the past, whether those transmissions have been successful, size of the hardware queue (including the software queue and/or the hardware queue) at various periods of time, the history of Clear Channel Assessment (CCA) counters, etc. The CCA counters generally refer to hardware counters that reflect whether a particular channel is occupied.

In addition, the software module may further maintain how many times it probes channel data associated with a particular channel, as well as the number of times it probes each of the sub-channels occupying the sub-bandwidth of the particular channel, etc. For example, if the software module has transmitted multiple probing packets at a short time interval, yet no response has been received for any of the probing packets, then the software module would need to adjust the probing scheme, for example, by probing at an increased interval or a different sub-channel, to reduce the cost of transmitting probing packets, especially when the software module is unable to obtain channel state from the probing activities.

Figure 4:
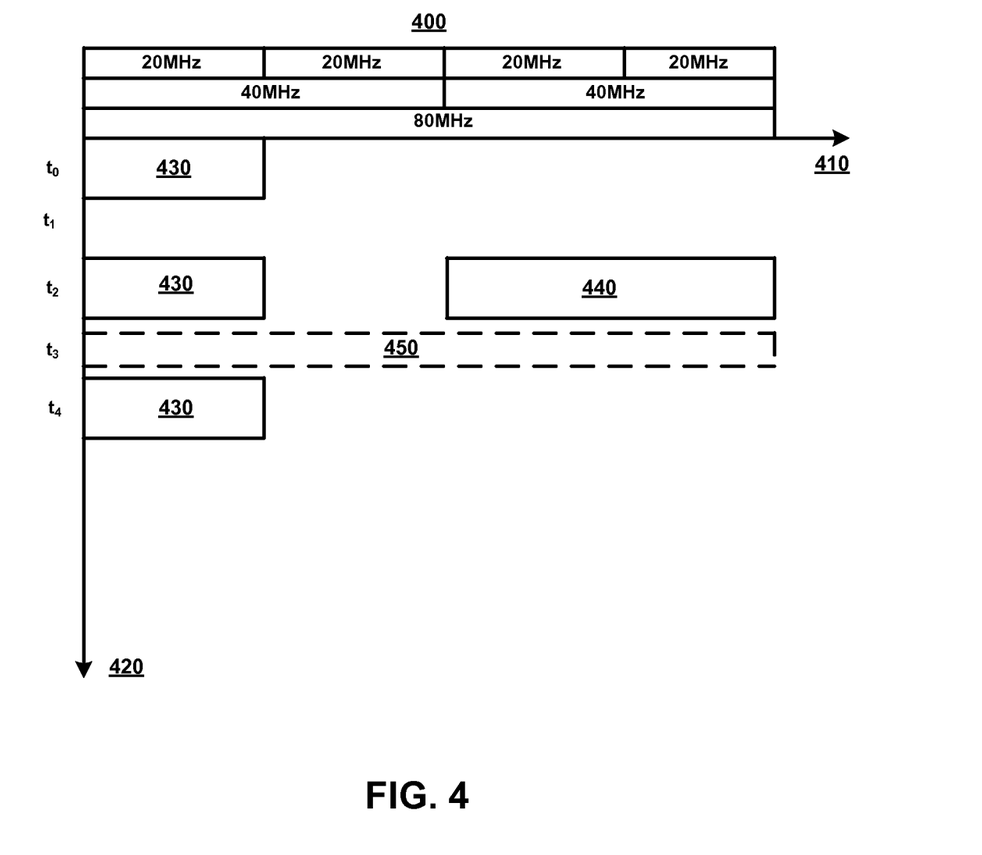
FIG. 4 illustrations an exemplary network packet transmission schedule at different bandwidths in accordance with embodiments of the present disclosure.

Unlike the hardware module, the software module is able to access not only current probing data, but also historical probing data. Thus, the software module can make decisions based on both current probing state of the channel and historical probing data. FIG. 4 illustrates a detailed example of a network packet transmission schedule according to embodiments of the present disclosure. In determining such network packet transmission schedule, the software module utilizes historical data to make intelligent decisions on channel bandwidth selections.

FIG. 4 illustrates an exemplary network packet transmission schedule at different bandwidths in accordance with embodiments of the present disclosure. Conventionally, a simple network packet transmission schedule is employed by the hardware module. That is, the hardware module will determine a best channel for transmitting a packet instantly based on a current channel condition. Nevertheless, in many cases, it may be worthwhile to wait for a channel to become available in the near future to transmit the packet on the same channel, rather than switching to a new channel that is currently available to transmit the packet instantly.

In particular, FIG. 4 shows various ways of utilizing a particular frequency domain 400. For example, frequency domain 400 can be used as four continuous 20 MHz channels, two continuous 40 MHz channels, and/or a single 80 MHz channel for wireless network packet transmissions. Moreover, horizontal axis 410 represents a spectrum of different frequencies that can be used for wireless transmissions in a WLAN. On the other hand, vertical axis 420 indicates the time progression.

In this example, there is an interference signal 430 that periodically occupies the lowest 20 MHz frequency range of the frequency domain. For example, interference signal 430 appears at time period $t_0$, $t_2$, $t_4$, etc. When a set of packets is to be forwarded from the software module to the hardware module at $t_2$, the hardware module can transmit the set of packet using an upper 40 MHz channel 440. Without analyzing any historical data, the 40 MHz channel 440 would be the best available channel for transmitting the set of packet at time period $t_2$. However, when the software module analyzes historical channel data, the software module will detect that the interference signal 430 is likely to occupy the lowest 20 MHz frequency range at a fixed interval. Thus, the software module may infer that at time $t_3$, the entire 80 MHz frequency domain will likely be available, and thus can be used as a single 80 MHz channel. Therefore, instead of transmitting the set of packets instantly on the 40 MHz channel 440 during time period $t_2$, the software module can assign the set of packet to be transmitted on an 80 MHz channel. When the hardware module receives the set of packets that is assigned to the 80 MHz channel at $t_2$, the hardware module will determine that the 80 MHz channel is unavailable, and thus will wait for the channel to become available rather than transmitting the set of packets instantly. Subsequently, at time period $t_3$ when the 80 MHz channel becomes available, the hardware module will transmit the set of packets on the 80 MHz channel as assigned by the software module. Even though the hardware module has to postpone the transmission of the set of packet from $t_2$ to $t_3$, the set of packets may still complete its transmission earlier on the 80 MHz channel than the 40 MHz channel, because the 80 MHz channel offers better channel quality and higher throughput.

Dynamic Determination of Number of Packets Transmitted to Hardware Queue

According to embodiments of present disclosure, the software module may dynamically select a number of packets from the software queue to be added to the hardware queue maintained by the hardware. The size of each set of packets being sent to the hardware can vary based on different considerations.

First, a small size of packets sent to hardware module would allow for quick adaptive response to channel condition changes. For example, if hardware queue 350 adds 100 packets at a time, then hardware queue 350 has to wait for transmission to complete for all of the 300 packets before it can adapt to any channel condition changes. By contrast, if hardware queue 350 only adds 5 packets each time, it would allow hardware queue 350 to respond to network/channel condition changes almost instantly.

Second, the WLAN software module may purposefully select a particular channel bandwidth to be associated with a small set of packets to test channel conditions before selecting the particular channel bandwidth for more packets. For example, if the WLAN software module has been assigning many sets of packets to be transmitted on the 40 MHz channel, it may assign a single set of packet to be transmitted on the 80 MHz channel. If system receives an acknowledgement that the single set of packet is successfully transmitted on the 80 MHz channel, the WLAN software module may assign subsequent sets of packets to be transmitted on the 80 MHz channel, because transmission on the 80 MHz channel is more efficient than the 40 MHz channel. However, if the single set of packets is not successfully transmitted on the 80 MHz channel, the WLAN software module will continue assigning packets to be transmitted on the 40 MHz channel that has been successful in the past.

Furthermore, in some embodiments, when the WLAN software module has determined that a particular channel with a particular channel bandwidth has been in an excellent channel condition, the WLAN software module may significantly increase the number of packets that it sends to the WLAN hardware module each time. This will increase the throughput, and thus allow for more efficient utilization of the excellent channel condition. Therefore, the WLAN software module may determine to send a large number of packets if the historical data indicates good channel conditions, and to send a small number of packets if the historical data indicates poor or changing channel conditions.

In addition, the WLAN software module can also monitor the packet transmission success rate as compared to the type of application that is associated with the packets. If the application can be running with a relatively high packet loss rate, then the application can tolerate channel condition changes well. Thus, the WLAN software module may continue to send a large number of packets to the hardware module for increased throughput. On the other hand, if the application is loss-sensitive and cannot be executed beyond a particular level of packet loss rate, then the software module will reduce the number of packets sent to the hardware module each time to allow a quick response to any channel condition change.

Figure 5A:
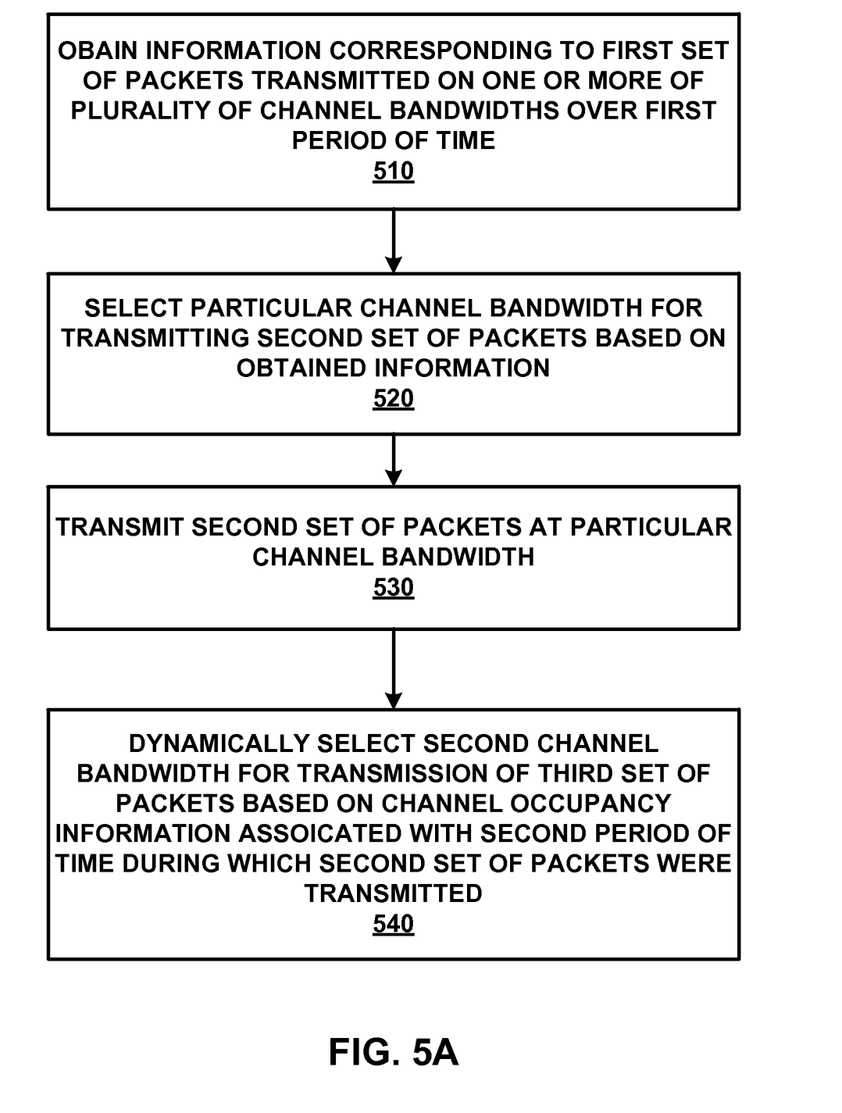
FIGS. 5A-5B illustrate exemplary processes for dynamic channel bandwidth selection based on information for packet transmitted at different channel bandwidths according to embodiments of the present disclosure.
Figure 5B:
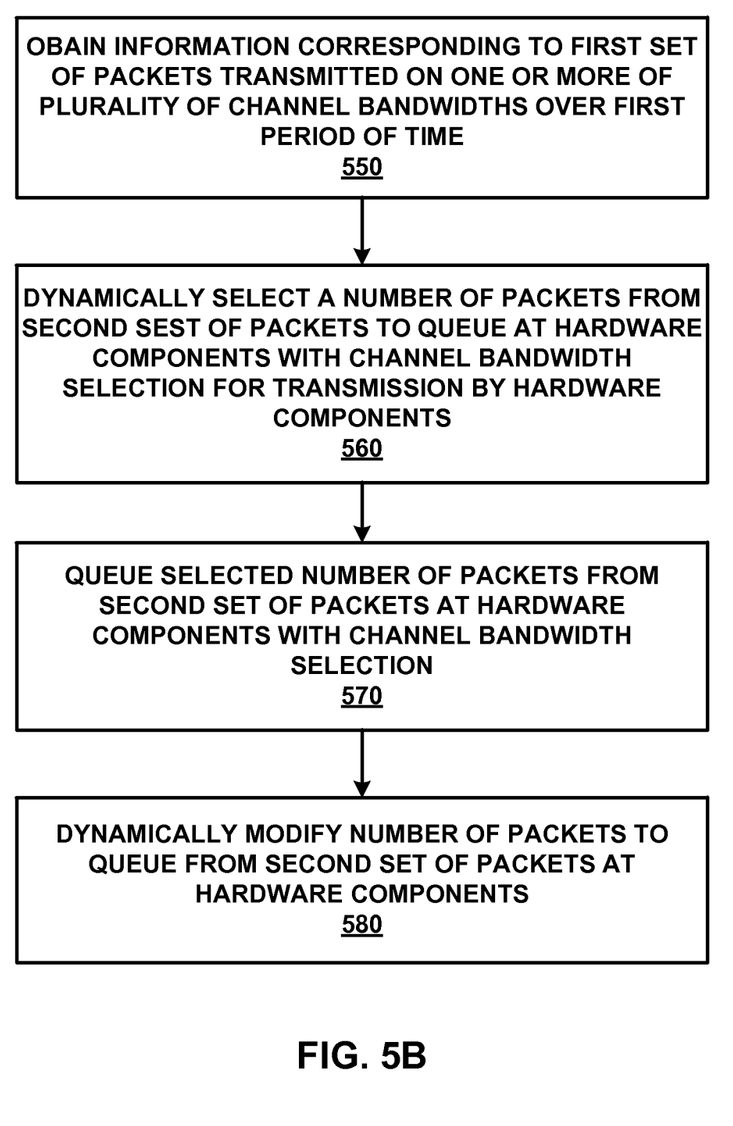

Processes for Dynamic Channel Bandwidth Selection and Determination of Number of Packets Transmitted to Hardware Queue FIGS. 5A-5B illustrate exemplary processes for dynamic channel bandwidth selection based on information for packet transmitted at different channel bandwidths according to embodiments of the present disclosure.

In particular, FIG. 5A illustrates an exemplary process for dynamic channel bandwidth. During operations, a network device obtains information corresponding to a first set of packets transmitted on one or more of a plurality of channel bandwidths over a first period of time (operation 510). Based on the information, the network device selects a particular channel bandwidth, of the plurality of channel bandwidths, for transmitting a second set of packets (operation 520). Also, the network device transmits the second set of packets at the particular channel bandwidth (operation 530). In some embodiments, the network device further dynamically selects a second channel bandwidth for transmission of a third set of packets based on channel occupancy information associated with a second period of time during which the second set of packets were transmitted (operation 540).

In some embodiments, the particular channel bandwidth has a first channel width, and a second channel bandwidth, in the plurality of channel bandwidths, has a second channel width different than the first channel width. For example, the particular channel bandwidth may be 40 MHz, and the second channel bandwidth may be 80 MHz. In addition, the particular channel bandwidth and the second channel bandwidth may correspond to different radio frequencies. For example, the particular channel bandwidth may correspond to a 40 MHz range on channel 36, whereas the second channel bandwidth may correspond to an 80 MHz range, which consists of combined 40 MHz channel 36 and channel 40. In some embodiments, the first period of time is greater than the time in which it takes to transmit a preamble for packets, e.g., 28 microseconds.

In some embodiments, the information corresponding to the first set of packets indicates an amount of time used to successfully transmit the first set of packets. Furthermore, the information corresponding to the first set of packets can identify channel occupancy information for each of the plurality of channel bandwidths.

In some embodiments, the network device generates the information by probing the plurality of channel bandwidths to determine channel occupancy information. Note that, channel occupancy information indicates, for example, whether packets are being transmitted on a channel or not being transmitted on a channel.

In some embodiments, the information corresponding to the first set of packets indicates a success rate for transmission of the first set of packets.

In some embodiments, based on the information corresponding to the first set of packets, the network device selects a number of packets to queue at hardware components with channel bandwidth selection for transmission by the hardware components.

In some embodiments, based on one or more of a reliability requirement or a throughput requirement, the network device can select a number of packets to queue at hardware components with channel bandwidth selection for transmission by the hardware components.

In some embodiments, the network device further transmits the second set of packets comprises queuing the second set of packets at hardware components for transmission using the particular channel bandwidth.

FIG. 6B shows a flowchart for an exemplary process for determination of a number of packets to be sent to the hardware queue according to embodiments of the present disclosure. During operations, a network device obtains information corresponding to a first set of packets transmitted on one or more of a plurality of channel bandwidths over a first period of time (operation 550). Based on the information, the network device dynamically selects a number of packets, from a second set of packets, to queue at hardware components with channel bandwidth selection for transmission by the hardware components (operation 560). Also, the network device queues the selected number of packets, from the second set of packets, at the hardware components with channel bandwidth selection (operation 570). In addition, the network device may dynamically modify the number of packets to queue, from the second set of packets, at the hardware components based on a detected channel occupancy.

In particular, the network device may dynamically modify the number of packets to queue, from the second set of packets, at the hardware components based on an amount of time needed for the hardware components to successfully transmit the previously queued packets from the second set of packets.

In some embodiments, based on one or more of a reliability requirement or a throughput requirement, the network device can dynamically modify the number of packets to queue at the hardware components with channel bandwidth selection for transmission by the hardware components.

For example, if a set of packets requires high transmission reliability, the transmission of the set of packets cannot tolerate channel condition changes. Thus, the network device will send only a small number of packets to the hardware queue each time. By contrast, if the set of packets requires low transmission reliability, the transmission of the packets can tolerate a certain number of packet losses and hence less sensitive to channel condition changes. The network device will send a relatively large number of packets to the hardware queue.

As another example, if a set of packets requires a large throughput, then the network device will send a large number of packets to be queued at the hardware component. On the other hand, if there is no throughput requirement associated with the set of packets, the network device may send a regular number of packets to be queued at the hardware component. Furthermore, prior to sending a large number of packets to be queued at the hardware component, the network device may send a few smaller sets of packets to test on a particular channel to ensure that the channel condition is good and stable for high throughput packet transmissions.

Figure 6:
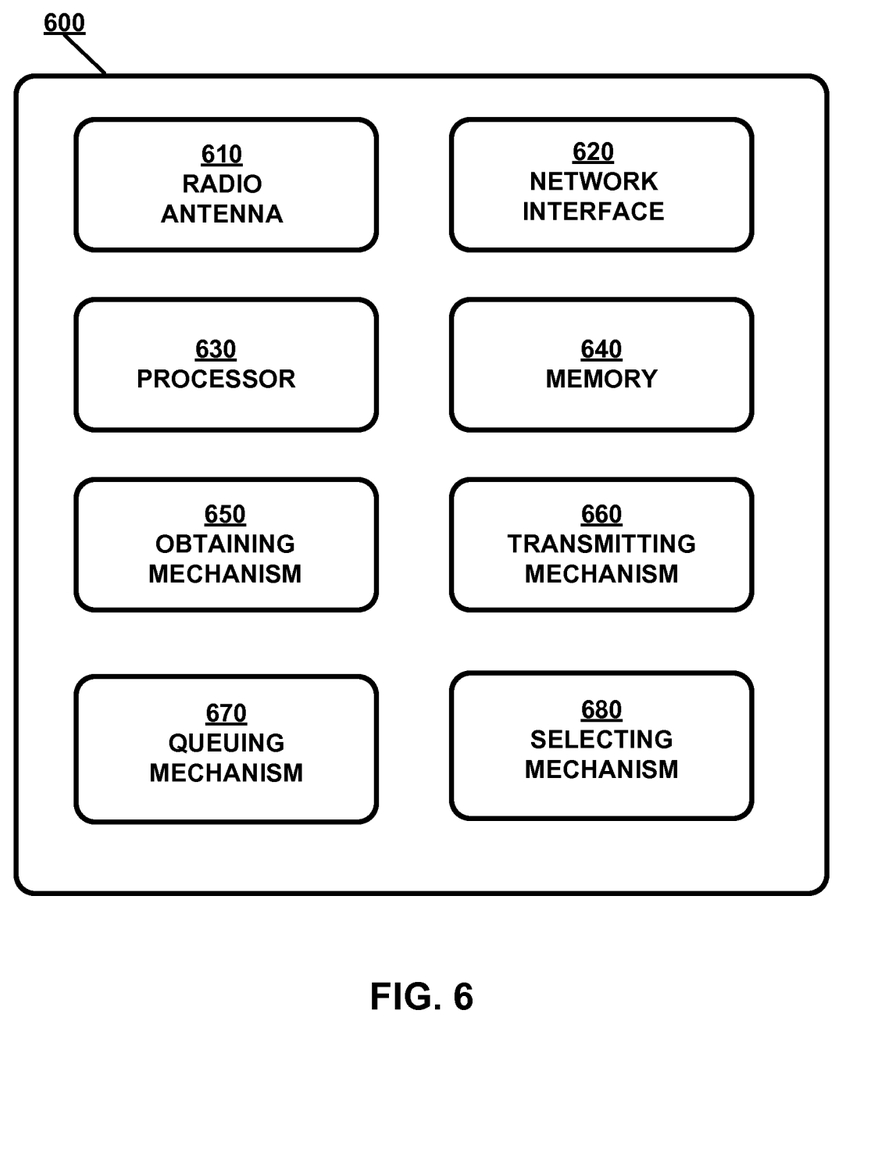
FIG. 6 is a block diagram illustrating a system for dynamic channel bandwidth selection based on information for packet transmitted at different channel bandwidths according to embodiments of the present disclosure.

System for Dynamic Channel Bandwidth Selection and Determination of Number of Packets Transmitted to Hardware Queue FIG. 6 is a block diagram illustrating a system for dynamic channel bandwidth selection according to embodiments of the present disclosure.

Network device 600 includes at least one or more radio antennas 610 capable of either transmitting or receiving radio signals or both, a network interface 620 capable of communicating to a wired or wireless network, a processor 630 capable of processing computing instructions, and a memory 640 capable of storing instructions and data. Moreover, network device 600 further includes an obtaining mechanism 650, a transmitting mechanism 660, a queuing mechanism 670, and a selecting mechanism 680, all of which are in communication with processor 630 and/or memory 640 in network device 600. Network device 600 may be used as a client system, or a server system, or may serve both as a client and a server in a distributed or a cloud computing environment.

Radio antenna 610 may be any combination of known or conventional electrical components for receipt of signaling, including but not limited to, transistors, capacitors, resistors, multiplexers, wiring, registers, diodes or any other electrical components known or later become known.

Network interface 620 can be any communication interface, which includes but is not limited to, a modem, token ring interface, Ethernet interface, wireless IEEE 802.11 interface, cellular wireless interface, satellite transmission interface, or any other interface for coupling network devices.

Processor 630 can include one or more microprocessors and/or network processors. Memory 640 can include storage components, such as, Dynamic Random Access Memory (DRAM), Static Random Access Memory (SRAM), etc.

Obtaining mechanism 650 generally receives one or more network messages via network interface 620 or radio antenna 610 from a wireless client. The received network messages may include, but are not limited to, requests and/or responses, beacon frames, management frames, control path frames, and so on. In some embodiments, the packets received by receiving mechanism 650 from the client device are acknowledgement frames (e.g., ACKs), channel feedback information (such as Clear Channel Assessment (CCA) information), etc. In some embodiments, obtaining mechanism 650 obtains information corresponding to a set of packets transmitted on one or more of a plurality of channel bandwidths over a period of time.

Transmitting mechanism 660 generally transmits messages, which include, but are not limited to, requests and/or responses, beacon frames, management frames, control path frames, and so on. Transmitting mechanism 660 may transmit queued packets. In particular, transmitting mechanism 660 may transmit a set of packets at a particular channel bandwidth.

Queuing mechanism 670 generally queues packets for transmission at a future time at a selected channel bandwidth. In some embodiments, queuing mechanism 670 collaborates with transmitting mechanism 660, and queues the set of packets at hardware components for transmission using the particular channel bandwidth.

Furthermore, queuing mechanism 670 queues a selected number of packets, from the set of packets, at the hardware components with channel bandwidth selection. Queuing mechanism 670 may further dynamically modify the number of packets to queue, from the second set of packets, at the hardware components based on a detected channel occupancy. Likewise, queuing mechanism 670 may dynamically modify the number of packets to queue, from the second set of packets, at the hardware components based on an amount of time needed for the hardware components to successfully transmit the previously queued packets from the second set of packets. Additionally, based on one or more of a reliability requirement and/or a throughput requirement, queuing mechanism 670 dynamically modify the number of packets to queue at the hardware components with channel bandwidth selection for transmission by the hardware components.

Selecting mechanism 680 generally selects a channel bandwidth for transmitting one or more packets, or selects a number of packets to be queued by the hardware components. Based on information corresponding to the packets, selecting mechanism 680 selects a particular channel bandwidth, of the plurality of channel bandwidths, for transmitting a subsequent set of packets. In some embodiments, the particular channel bandwidth has a first channel width, and a second channel bandwidth, in the plurality of channel bandwidths, has a second channel width different than the first channel width. In addition, in some embodiments, the particular channel bandwidth and the second channel bandwidth correspond to different radio frequencies.

In some embodiments, selecting mechanism 680 dynamically selects a second channel bandwidth for transmission of a third set of packets based on channel occupancy information associated with a second period of time during which the second set of packets were transmitted. The first period of time typically is greater than the time period in which it takes to transmit a preamble for packets, e.g., 28 microseconds. Thus, the first period of time is greater than the time it takes for an instantaneous response to a channel condition change.

In some embodiments, the information corresponding to the set of packets may indicate an amount of time used to successfully transmit the set of packets. In some embodiments, the information corresponding to the set of packets identifies channel occupancy information for each of the plurality of channel bandwidths. In some embodiments, the information corresponding to the set of packets indicates a success rate for transmission of the set of packets.

In some embodiments, selecting mechanism 680 also generates the information by probing the plurality of channel bandwidths to determine channel occupancy information. The channel occupancy information indicates whether packets are being transmitted on a channel or not being transmitted on a channel.

In some embodiments, based on the information corresponding to the set of packets, selecting mechanism 680 selects a number of packets to queue at hardware components with channel bandwidth selection for transmission by the hardware components. In addition, in some embodiments, based on the information, selecting mechanism 680 dynamically selects a number of packets from a second set of packets, to queue at hardware components with channel bandwidth selection for transmission by the hardware components.

Furthermore, in some embodiments, based on one or more of a reliability requirement or a throughput requirement, selecting mechanism 680 selects a number of packets to queue at hardware components with channel bandwidth selection for transmission by the hardware components.

The present disclosure may be realized in hardware, software, or a combination of hardware and software. The present disclosure may be realized in a centralized fashion in one computer system or in a distributed fashion where different elements are spread across several interconnected computer systems coupled to a network. A typical combination of hardware and software may be an access point with a computer program that, when being loaded and executed, controls the device such that it carries out the methods described herein.

The present disclosure also may be embedded in non-transitory fashion in a computer-readable storage medium (e.g., a programmable circuit; a semiconductor memory such as a volatile memory such as random access memory "RAM," or non-volatile memory such as read-only memory, power-backed RAM, flash memory, phase-change memory or the like; a hard disk drive; an optical disc drive; or any connector for receiving a portable memory device such as a Universal Serial Bus "USB" flash drive), which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

As used herein, "network device" generally includes a device that is adapted to transmit and/or receive signaling and to process information within such signaling such as a station (e.g., any data processing equipment such as a computer, cellular phone, personal digital assistant, tablet devices, etc.), an access point, data transfer devices (such as network switches, routers, controllers, etc.) or the like.

As used herein, "access point" (AP) generally refers to receiving points for any known or convenient wireless access technology which may later become known. Specifically, the term AP is not intended to be limited to IEEE 802.11-based APs. APs generally function as an electronic device that is adapted to allow wireless devices to connect to a wired network via various communications standards.

As used herein, the term "interconnect" or used descriptively as "interconnected" is generally defined as a communication pathway established over an information-carrying medium. The "interconnect" may be a wired interconnect, wherein the medium is a physical medium (e.g., electrical wire, optical fiber, cable, bus traces, etc.), a wireless interconnect (e.g., air in combination with wireless signaling technology) or a combination of these technologies.

As used herein, "information" is generally defined as data, address, control, management (e.g., statistics) or any combination thereof. For transmission, information may be transmitted as a message, namely a collection of bits in a predetermined format. One type of message, namely a wireless message, includes a header and payload data having a predetermined number of bits of information. The wireless message may be placed in a format as one or more packets, frames or cells.

As used herein, "wireless local area network" (WLAN) generally refers to a communications network links two or more devices using some wireless distribution method (for example, spread-spectrum or orthogonal frequency-division multiplexing radio), and usually providing a connection through an access point to the Internet; and thus, providing users with the mobility to move around within a local coverage area and still stay connected to the network.

As used herein, the term "mechanism" generally refers to a component of a system or device to serve one or more functions, including but not limited to, software components, electronic components, electrical components, mechanical components, electro-mechanical components, etc.

As used herein, the term "embodiment" generally refers an embodiment that serves to illustrate by way of example but not limitation.

It will be appreciated to those skilled in the art that the preceding examples and embodiments are exemplary and not limiting to the scope of the present disclosure. It is intended that all permutations, enhancements, equivalents, and improvements thereto that are apparent to those skilled in the art upon a reading of the specification and a study of the drawings are included within the true spirit and scope of the present disclosure. It is therefore intended that the following appended claims include all such modifications, permutations and equivalents as fall within the true spirit and scope of the present disclosure.

While the present disclosure has been described in terms of various embodiments, the present disclosure should not be limited to only those embodiments described, but can be practiced with modification and alteration within the spirit and scope of the appended claims. Likewise, where a reference to a standard is made in the present disclosure, the reference is generally made to the current version of the standard as applicable to the disclosed technology area. However, the described embodiments may be practiced under subsequent development of the standard within the spirit and scope of the description and appended claims. The description is thus to be regarded as illustrative rather than limiting.

What is claimed is:

1. A non-transitory computer readable medium comprising instructions which, when executed by a processor, cause the processor to
    obtaining historical information corresponding to a first set of packets transmitted on a plurality of channel bandwidths over a first period of time, wherein the historical information indicates at least when each of the plurality of channel bandwidths is to be available;
    based on the historical information and current channel information select a particular channel bandwidth of the plurality of channel bandwidths for transmission of a second set of packets;
    wherein an occupied channel bandwidth of the plurality of channel bandwidths of the plurality of channel bandwidths is selected over an available channel bandwidth of the plurality of channel bandwidths when the historical information indicates that:
        the occupied channel bandwidth has a higher average transmission rate than the available channel bandwidth; and
        the occupied bandwidth is to be available within a threshold amount of time select a number of packets as the second set of packets based on historical information;
    wherein a lesser number of packets is selected as the second set of packets if the channel condition of the selected channel is currently changing; and
    transmit the second set of packets at the particular channel bandwidth.

2. The medium of claim 1, comprising instructions to dynamically select a second channel bandwidth for transmission of a third set of packets based on channel occupancy information associated with a second period of time during which the plurality of a set of packets transmitted over the first period of time and the first set of packets were transmitted.

3. The medium of claim 1, wherein the particular channel bandwidth is a first channel bandwidth and has a first channel width, and wherein a second channel bandwidth, in the plurality of channel bandwidths, has a second channel width different than the first channel width.

4. The medium of claim 1, wherein the particular channel bandwidth is a first channel bandwidth and has a first channel width, wherein a second channel bandwidth, in the plurality of channel bandwidths, has a second channel width identical to the first channel width, and wherein the particular channel bandwidth and the second channel bandwidth correspond to different radio frequencies.

5. The medium of claim 1, wherein the first period of time is greater than 28 microseconds.

6. The medium of claim 1, wherein the historical information indicates an amount of time used to successfully transmit the first set of packets.

7. The medium of claim 1, wherein the historical information identifies channel occupancy information for each of the plurality of channel bandwidths.

8. The medium of claim 1, comprising instructions to generate the historical information by probing the plurality of channel bandwidths to determine channel occupancy information.

9. The medium of claim 1, wherein the historical information indicates a success rate for transmission of the first set of packets.

10. The medium of claim 1, wherein the selection of the first set of packets is further based on a reliability requirement or a throughput requirement.

11. A non-transitory computer readable medium comprising instructions which, when executed by a processor, cause the processor to:
    obtain historical information corresponding to each set of packets transmitted at a respective channel bandwidth of the plurality of channel bandwidths, wherein the historical information indicates at least when each of the plurality of channel bandwidths is to be available;
    based on the historical information, dynamically select a number of packets from a set of packets at a first queue, wherein the selected number of packets is less than a total number of the set of packets;
    based on the historical information and the selection of the set of packets from the first queue, select a channel bandwidth for transmission of the set of packets;
    wherein an occupied channel bandwidth of the plurality of channel bandwidths of the plurality of channel bandwidths is selected over an available channel bandwidth of the plurality of channel bandwidths when the historical information indicates that:
        the occupied channel bandwidth has a higher average transmission rate than the available channel bandwidth; and
        the occupied bandwidth is to be available within a threshold amount of time;
    place the selected number of packets from the first queue to a second queue with the selection of the channel bandwidth for transmission from the second queue;
    queue the selected number of packets, from the set of packets, at the second queue with channel bandwidth selection, wherein the selection of the channel bandwidth is modifiable prior to queuing the selected number of packets at the second queue; and wherein fewer packets of the selected number of packets are placed from the first queue to the second queue if the channel condition of the channel bandwidth selection is currently changing;

transmit the selected number of packets from the second queue of packets at channel bandwidth selection.

12. The medium of claim 11, comprising instructions to dynamically modify the number of packets to queue, from the set of packets, at hardware components based on a detected channel occupancy.

13. The medium of claim 11, comprising instructions to dynamically modify the number of packets to queue, from the set of packets, at hardware components based on an amount of time needed for the hardware components to successfully transmit the previously queued packets from the set of packets.

14. The medium of claim 11, comprising instructions to, based on a reliability requirement or a throughput requirement, dynamically modify the number of packets to queue at hardware components with channel bandwidth selection for transmission by the hardware components.

15. The medium of claim 11, wherein the selection of the particular channel bandwidth for transmission of the set of packets is modifiable until delivery of the set of packets from the first queue to the second queue.

16. The medium of claim 11, wherein the historical information is in part based on a clear channel assessment on the particular channel.

17. The medium of claim 11, wherein the instructions to select the particular channel bandwidth, of the plurality of channel bandwidths for transmitting the set of packets further comprises instructions to modify a channel bandwidth to obtain the particular channel bandwidth prior to delivery of the set of packets to the second queue.

18. A system comprising:
a networking device comprising:
a first module, maintaining a first queue of packets, the first module to:
access historical information, wherein the historical information indicates, based at least on an average time taken for the plurality of set of packets to be transmitted in channel bandwidths previously, when each of a plurality of channel bandwidths is to be available;

determine a set of packets for transmission;

select a set of transmission rates for the determined set of packets; and deliver the determined set of packets with the selected set of transmission rates from the first queue of packets to a second queue of packets;

a second module, maintaining a second queue of packets, the second module to:

based on the selected set of transmission rates and the historical information, select a channel bandwidth of the plurality of channel bandwidths for transmission of the determined set of packets;

wherein an occupied channel bandwidth of the plurality of channel bandwidths of the plurality of channel bandwidths is selected over an available channel bandwidth of the plurality of channel bandwidths when the historical information indicates that:

the occupied channel bandwidth has a higher average transmission rate than the available channel bandwidth; and the occupied bandwidth is to be available within a threshold amount of time;

place determined set of packets in the second queue of packets for transmission, wherein the selected channel bandwidth is fixed upon placement of the determined set of packets in the second queue; and wherein fewer packets of the determined set of packets are placed from the first queue to the second queue if the channel condition of the channel bandwidth selection is currently changing;

transmit the determined set of packets from the second queue of packets at the selected channel bandwidth.

19. The system of claim 18 wherein to determine the set of packets for transmission, the first module is to select the set of packets from a total number of packets available at the first queue of packets, wherein a number of the set of packets is less than the total number of packets available at the first queue of packets.

* * * * *